(12) United States Patent
Guizar

(10) Patent No.: US 8,914,804 B2
(45) Date of Patent: Dec. 16, 2014

(54) HANDLING QUEUES ASSOCIATED WITH WEB SERVICES OF BUSINESS PROCESSES

(75) Inventor: Alejandro Guizar, Houston, TX (US)

(73) Assignee: Red Hat, Inc., Raleigh, NC (US)

( * ) Notice: Subject to any disclaimer, the term of this patent is extended or adjusted under 35 U.S.C. 154(b) by 1442 days.

(21) Appl. No.: 11/900,707

(22) Filed: Sep. 12, 2007

(65) Prior Publication Data

US 2009/0070764 A1 Mar. 12, 2009

(51) Int. Cl.

| G06F 17/30 | (2006.01) |
|---|---|
| G06F 7/00 | (2006.01) |
| G06F 9/46 | (2006.01) |
| G06F 13/00 | (2006.01) |
| G06Q 10/06 | (2012.01) |
| G06F 9/44 | (2006.01) |
| G06F 9/54 | (2006.01) |
| G06F 9/50 | (2006.01) |
| G06Q 50/22 | (2012.01) |
| G06F 9/445 | (2006.01) |
| H04L 29/08 | (2006.01) |

(52) U.S. Cl.
CPC .......... *G06F 9/544* (2013.01); *G06Q 10/06* (2013.01); *G06F 8/10* (2013.01); *G06F 9/546* (2013.01); *G06F 9/5083* (2013.01); *G06Q 50/22* (2013.01); *G06F 8/65* (2013.01); *G06F 8/61* (2013.01); *G06F 8/30* (2013.01); *H04L 67/322* (2013.01)
USPC ........... 718/104; 719/314; 709/226; 709/201; 709/206; 707/758; 707/803

(58) Field of Classification Search
CPC .......... G06F 9/546; G06F 9/54; G06F 9/544; G06F 9/542
See application file for complete search history.

(56) References Cited

U.S. PATENT DOCUMENTS

| 4,197,430 | A | * | 4/1980 | Dowden | 379/266.07 |
|---|---|---|---|---|---|
| 5,809,297 | A | | 9/1998 | Kroenke et al. | |
| 6,654,748 | B1 | | 11/2003 | Rabung et al. | |
| 7,069,553 | B2 | | 6/2006 | Narayanaswamy et al. | |
| 7,131,123 | B2 | | 10/2006 | Suorsa et al. | |
| 7,151,744 | B2 | * | 12/2006 | Sarkinen et al. | 370/230 |
| 7,231,267 | B2 | | 6/2007 | Boumas et al. | |
| 7,246,358 | B2 | | 7/2007 | Chinnici et al. | |
| 7,284,039 | B2 | | 10/2007 | Berkland et al. | |
| 7,290,258 | B2 | | 10/2007 | Steeb et al. | |
| 7,322,031 | B2 | | 1/2008 | Davis et al. | |

(Continued)

OTHER PUBLICATIONS

Websphere Message Broker Manual, publib.boulder.ibm.com/infocenter/wmbhelp/v6r0m0/index.jsp, Sep. 30, 2005.*

(Continued)

*Primary Examiner* — Lewis A Bullock, Jr.
*Assistant Examiner* — Kevin X Lu
(74) *Attorney, Agent, or Firm* — Lowenstein Sandler LLP

(57) ABSTRACT

A method and apparatus for handling queues associated with web services of a business process. The method may include generating deployment descriptors for executing a business process as a web application, and determining a default queue for the business process using a business process management (BPM) configuration file. During execution of the business process, users are allowed to monitor the message load associated with the default queue. If a user decides to redistribute the message load, the user is allowed to specify a new set of queues for the business process to improve performance of the business process at runtime.

20 Claims, 7 Drawing Sheets

(56) References Cited

U.S. PATENT DOCUMENTS

| | | | |
|---|---|---|---|
| 7,454,492 | B2 | 11/2008 | Bauer et al. |
| 7,487,513 | B1 | 2/2009 | Savchenko et al. |
| 7,519,972 | B2 | 4/2009 | Carr et al. |
| 7,577,964 | B2 | 8/2009 | Beringer et al. |
| 7,647,392 | B2 | 1/2010 | Sharma et al. |
| 7,665,085 | B2 | 2/2010 | Sundararajan et al. |
| 7,694,140 | B1 | 4/2010 | Sachenko et al. |
| 7,770,151 | B2 * | 8/2010 | Sanjar et al. ............... 717/109 |
| 7,822,826 | B1 | 10/2010 | Savchenko et al. |
| 7,822,860 | B2 | 10/2010 | Brown et al. |
| 7,836,441 | B2 | 11/2010 | Chen et al. |
| 7,856,631 | B2 | 12/2010 | Brodkorb et al. |
| 7,861,243 | B2 | 12/2010 | Narayanaswamy et al. |
| 7,890,956 | B2 | 2/2011 | Angelov et al. |
| 7,908,294 | B2 | 3/2011 | Ansari |
| 8,423,955 | B2 | 4/2013 | Baeyens et al. |
| 2002/0178254 | A1* | 11/2002 | Brittenham et al. ......... 709/224 |
| 2002/0178394 | A1 | 11/2002 | Bamberger et al. |
| 2003/0050392 | A1 | 3/2003 | Higashiyama et al. |
| 2003/0078934 | A1 | 4/2003 | Cappellucci et al. |
| 2003/0093321 | A1* | 5/2003 | Bodmer et al. ................ 705/26 |
| 2003/0225757 | A1 | 12/2003 | Evans et al. |
| 2003/0233503 | A1* | 12/2003 | Yang et al. .................... 710/100 |
| 2004/0034669 | A1 | 2/2004 | Smith et al. |
| 2004/0039748 | A1 | 2/2004 | Jordan, II et al. |
| 2004/0098311 | A1 | 5/2004 | Nair et al. |
| 2004/0128622 | A1 | 7/2004 | Mountain et al. |
| 2004/0133876 | A1 | 7/2004 | Sproule |
| 2004/0177335 | A1 | 9/2004 | Beisiegel et al. |
| 2004/0177352 | A1 | 9/2004 | Narayanaswamy et al. |
| 2005/0010456 | A1 | 1/2005 | Chang et al. |
| 2005/0071243 | A1 | 3/2005 | Somasekaran et al. |
| 2005/0114771 | A1 | 5/2005 | Piehler et al. |
| 2005/0165932 | A1* | 7/2005 | Banerjee et al. .............. 709/226 |
| 2005/0204354 | A1 | 9/2005 | Sundararajan et al. |
| 2005/0251468 | A1 | 11/2005 | Eder |
| 2005/0283837 | A1* | 12/2005 | Olivier et al. ................... 726/24 |
| 2006/0004783 | A1 | 1/2006 | Carr et al. |
| 2007/0011322 | A1 | 1/2007 | Moiso |
| 2007/0219971 | A1 | 9/2007 | Biermann et al. |
| 2007/0226196 | A1 | 9/2007 | Adya et al. |
| 2007/0226233 | A1 | 9/2007 | Walter et al. |
| 2007/0240127 | A1 | 10/2007 | Roques et al. |
| 2007/0250575 | A1 | 10/2007 | Tseitlin et al. |
| 2007/0260629 | A1 | 11/2007 | Tseitlin et al. |
| 2007/0280111 | A1* | 12/2007 | Lund .............................. 370/235 |
| 2008/0235682 | A1 | 9/2008 | Oren et al. |
| 2008/0320486 | A1 | 12/2008 | Bose et al. |
| 2009/0063225 | A1 | 3/2009 | Baeyens et al. |
| 2009/0064104 | A1 | 3/2009 | Baeyens et al. |
| 2009/0070362 | A1 | 3/2009 | Guizar et al. |
| 2009/0144729 | A1 | 6/2009 | Guizar et al. |
| 2009/0183150 | A1 | 7/2009 | Felts |
| 2010/0083273 | A1* | 4/2010 | Sihn et al. ..................... 718/104 |

OTHER PUBLICATIONS

IBM Websphere Application Server 5.1 Documentation, "Develop Web service deployment descriptor templates from the WSDL file", Version 5, Release 3, Oct. 4, 2005. publib.boulder.ibm.com/infocenter/iseries/v5r3/index.jsp?topic=%2Frzatz%2F51%2Fwebserv%2Fwsdevddtemp.htm.*

IBM WebSphere 6 Documentation, "WebSphere MQ custom properties" Sep. 2, 2006. publib.boulder.ibm.com/infocenter/wasinfo/v6r1/index.jsp?topic=%2Fcom.ibm.websphere.base.doc%2Finfo%2Faes%2Fae%2Fcmm_customprops.html.*

IBM WebSphere 6 Documentation, "Publish/subscribe messaging example using remote publication points," Oct. 5, 2005. publib.boulder.ibm.com/infocenter/dmndhelp/v6rxmx/index.jsp?topic=/com.ibm.websphere.pmc.nd.doc/concepts/cjo_remote_pubsub.html.*

IBM Corp., "WebSphere MQ Version 6.0—System Administration Guide", Feb. 15, 2005.*

IBM Corp., iSeries WebSphere Application Server—Express Version 5.1, May 13, 2003.*

Altentee, "Monitoring Queue Statistics in MQ," Apr. 30, 2007, altentee.com/blogs/2007/monitoring-queue-statistics-in-mq/.*

Various Authors, "MQSeries.net:: View topic—How can you keeping running total msgs per Queue for the day?," Aug. 26, 2005, www.mqseries.net/phpBB2/viewtopic.php?t=24005.*

Unknown Author, "Help—WebSphere MQ", Aug. 17, 2005, publib.boulder.ibm.com/infocenter/wmqv6/v6r0/index.jsp?topic=%2Fcom.ibm.mq.amqtac.doc%2Fwq10160_.htm, tasks 5 and 16.*

MQ Status Monitor (Unknown Author, "WebSphere MQ Status Monitor", 193.138.212.37/SiteScope/docs/MQStatMon.htm, Jan. 20, 2004).*

Unknown Author, How the maximum sessions property on the listener port affects WebSphere Application Server Performance, www.ibm.com/developerworks/websphere/library/techarticles/0602_kesavan/0602_kesavan.html, Feb. 8, 2006.*

Unknown Author, Configuring the Autonomic request flow manager, pic.dhe.ibm.com/infocenter/wxdinfo/v6r1/topic/com.ibm.websphere.ops.doc/info/odoe_task/todtunearfm.html, Nov. 2004.*

"jbpm-bpel-1.0-alpha1," jBPM.org Files on SourceForge.net, Jun. 1, 2005. 44 pages.

"jbpm-bpel-1.0-alpha2," jBPM.org Files on SourceForge.net, Jun. 24, 2005, 41 pages.

"jbpm-bpel-1.0-alpha3," jBPM.org Files on SourceForge.net, Sep. 6, 2005, 51 pages.

"jbpm-bpel-1.0-alpha4," jBPM.org Files on SourceForge.net, Dec. 26, 2005, 55 pages.

"jbpm-bpel-1.1-beta1," jBPM.org Files on SourceForge.net, Jun. 11, 2006, 58 pages.

Koenig, John, "JBoss jBPM," White Paper, www.riseforth.com, Nov. 2004. 10 pages.

Red Hat Office Action for U.S. Appl. No. 11/900,707, mailed May 13, 2011.

Red Hat Office Action for U.S. Appl. No. 11/900,740, mailed Oct. 2, 2009.

Red Hat Office Action U.S. Appl. No. 11/900,740, mailed Mar. 24, 2010.

Red Hat Office Action for U.S. Appl. No. 11/900,740, mailed Sep. 21, 2010.

Sun Microsystems, "Java2 Enterprise Edition Deployment API 1.1", 2002; [retrieved on Oct. 17, 2011]; Retrived from Internet <URL:http://java.sun.com/2ee/tools/deployment/88ChangeLog1/1-aug2802.html.;pp. 1-10.

Bea Systems, Inc. "Deploying WebLogic Platform Applications, Version 8.1 Service Pack 6", Jun. 2006. [retrieved on May 25, 2011]. Retrieved from Internet, URL:http://download.oracle.com/docs/cdE13196_01/platform/docs81/pdf/deploy.pdf>; pp. 1-172.

Red Hat Office Action for U.S. Appl. No. 11/897,910, mailed Feb. 2, 2011.

Red Hat Office Action for U.S. Appl. No. 11/879,910, mailed Aug. 5, 2011.

Red Hat Office Action for U.S. Appl. No. 11/897,910, mailed Nov. 18, 2011.

Red Hat Office Action for U.S. Appl. No. 11/900,740, mailed May 9, 2011.

Red Hat Office Action for U.S. Appl. No. 11/900,740, mailed Sep. 27, 2011.

Red Hat Office Action for U.S. Appl. No. 11/998,508, mailed Sep. 8, 2011.

Red Hat Office Action for U.S. Appl. No. 11/897,570, mailed Jun. 1, 2011.

Red Hat Office Action for U.S. Appl. No. 11/897,570, mailed Oct. 24, 2011.

Apte, Ajay "IBM WebSphere Developer Technical Journal: System Administration for WebSphere Application Server V5, Part 6—Application Management," Sep. 10, 2003, 8 pages.

Baeyens, Tom, "The State of Workflow," Jboss, May 28, 2007, 14 pages. http://www.ibm.com/developerworks/websphere/techjournal/0309_apte/apte.html.

Abstraction Layer as of Aug. 2, 2007 http://en.wikipedia.org/w/index.php?title=Abstraction_layer&oldid=148731044.

USPTO, Office Action for U.S. Appl. No. 11/897,910, mailed Mar. 19, 2012.

(56) References Cited

OTHER PUBLICATIONS

USPTO, Office Action for U.S. Appl. No. 11/900,740, mailed Mar. 1, 2012.
USPTO, Office Action for U.S. Appl. No. 11/998,508, mailed Jan. 13, 2012.
USPTO; Office Action for U.S. Appl. No. 11/897,910, mailed Aug. 8, 2012.
USPTO; Notice of Allowance for U.S. Appl. No. 11/897,910, mailed Dec. 18, 2012.
USPTO; Office Action for U.S. Appl. No. 11/900,740, mailed Oct. 25, 2012.
USPTO; Office Action for U.S. Appl. No. 11/998,508, mailed Dec. 31, 2012.
USPTO; Office Action for U.S. Appl. No. 11/897,570, mailed Sep. 28, 2012.
Houghton Mifflin Company, "The American Heritage College Dictionary", fourth edition; 2002; p. 441.
IBM, "Artifacts used to develop Web services based on Web Services for J2EE"; 2005, IBM online knowledge base; [retrieved on Jan. 26, 2013]; retrieved from Internet <URL:http://publib.boulder.ibm.com/infocenter/adiehelp/v5rlm1/topic/com.ibm.wasee.doc/ino/e . . . >; pp. 1-2.
Flurry et al., "The IBM Application Framework for e-business", 2001, IBM Systems Journal; [retrieved from Internet <URL:http://www.zota.ase.ro/eb/flurry.pdf>; pp. 8-24.
Sybase Chapter, First Edition: SYBASE Data Types; http://www.okstate.edu/sas/v8/sashtml/accdb/z0439559.htm, accessed Mar. 4, 2013.
PostgreSQL:Documentation 8.4: Data Types; http://www.postgresql.org/docs/8.4/static/datatype.html, accessed Mar. 4, 2013.
Oracle Datatypes; http://docs.oracle.com/cd/B19306_01/server.102/b14200/sql_elements00, accessed Mar. 4, 2013.
White, et al. "Automated Model-Based Configuration of Enterprise Java Applications"; 2007 IEEE [retrieved on Sep. 6, 2013]; Retrieved from internet <URL:ftp://icm.linuxberg.com/packages/ace/ACE/PDF/white-automated.pdf>; pp. 1-12.
USPTO, Office Action for U.S. Appl. No. 11/897,570, mailed Jan. 29, 2013.
USPTO, Office Action for U.S. Appl. No. 11/897,570, mailed May 17, 2013.
USPTO, Office Action for U.S. Appl. No. 11/897,570, mailed Oct. 4, 2013.
USPTO, Office Action for U.S. Appl. No. 11/998,508, mailed May 7, 2013.
USPTO, Office Action for U.S. Appl. No. 11/998,508, mailed Sep. 10, 2013.
USPTO, Office Action for U.S. Appl. No. 11/900,740, mailed May 6, 2013.
USPTO, Office Action for U.S. Appl. No. 11/900,740, mailed Aug. 30, 2013.
USPTO, Final Office Action for U.S. Appl. No. 11/900,740 mailed Dec. 13, 2013.

* cited by examiner

FIG. 5B

List of MBean attributes: 522

| Name | Type | Access | Value | Description |
|---|---|---|---|---|
| InMemory | boolean | RW | ○True ●False | MBean Attribute. |
| State | int | R | 3 | MBean Attribute. |
| RedeliveryDelay | long | RW | 0 | MBean Attribute. |
| RecoveryRetries | int | RW | 0 | MBean Attribute. |
| SubscribersCount 524 | int | R | 1 | MBean Attribute. |
| JNDIName | java.lang.String | RW | queue/A | MBean Attribute. |
| MessageCounter | [Lorg.jboss.mq.server.MessageCounter; | R | Queue,A,-,-,0,0,0,0,- | MBean Attribute. |
| QueueDepth 526 | int | R | 0 | MBean Attribute. |
| ScheduledMessageCount | int | R | 0 | MBean Attribute. |
| InProcessMessageCount | int | R | 0 | MBean Attribute. |
| StateString | java.lang.String | R | Started | MBean Attribute. |
| RedeliveryLimit | int | RW | -1 | MBean Attribute. |
| ReceiversCount | int | R | 1 | MBean Attribute. |
| QueueName | java.lang.String | R | A | MBean Attribute. |
| ReceiversImpl | java.lang.Class | R | | MBean Attribute. |
| MessageStatistics | [Lorg.jboss.mq.MessageStatistics; | R | Queue,A,-,-,0,0,0,0,- | MBean Attribute. |
| MaxDepth | int | RW | 0 | MBean Attribute. |
| ExpiryDestination | javax.management.ObjectName | RW | | MBean Attribute. |
| Name | java.lang.String | R | A | MBean Attribute. |
| DestinationManager | javax.management.ObjectName | RW | jboss.mq:service=Destin | View MBean | MBean Attribute. |
| MessageCounterHistoryDayLimit | int | RW | 0 | MBean Attribute. |
| SecurityManager | javax.management.ObjectName | W | | MBean Attribute. |
| SecurityConf | org.w3c.dom.Element | W | | MBean Attribute. |

HANDLING QUEUES ASSOCIATED WITH WEB SERVICES OF BUSINESS PROCESSES

TECHNICAL FIELD

Embodiments of the present invention relate to business process management (BPM), and more specifically to handling queues associated with web services of business processes.

BACKGROUND

Business process management (BPM) offers a programmatic structure for designing transactions and executing them using automated decisions, tasks and sequence flows. For example, an insurance company can use BPM to automate the steps involved in processing insurance claims. BPM solutions typically include a process definition tool, an engine that executes process definitions, and tools that aid process monitoring.

A process definition tool allows a process designer to specify a definition of a business process using a particular business process language. One exemplary language is the business process execution language (BPEL). BPEL is intended for business processes that interact with external entities through web service operations. BPEL's messaging facilities depend on the use of the web services description language (WSDL) to describe outgoing and incoming messages.

When a BPEL process is defined, it can be deployed as a web application using the Java 2 Enterprise Edition (J2EE) web services deployment model. The J2EE web services deployment model requires a set of deployment descriptors that define how to deploy and assemble components into a specific environment. These deployment descriptors may include, for example, a web component deployment descriptor, a web services deployment descriptor, and a BPEL application deployment descriptor. The web component deployment descriptor describes web components (e.g., servlets, Java server pages (JSPs), HTML files, etc.) used by a web module, environment variables, and security settings. The web services deployment descriptor defines web services produced by the business process and declares deployment characteristics of the web services. The BPEL application descriptor defines one or more queues for web services of the business process. The deployment descriptors are typically written manually by developers familiar with the J2EE web services deployment model.

BRIEF DESCRIPTION OF THE DRAWINGS

The present invention is illustrated by way of example, and not by way of limitation, and can be more fully understood with reference to the following detailed description when considered in connection with the figures in which:

FIGS. 5A and 5B illustrate exemplary UIs facilitating monitoring of message load at a queue.

DETAILED DESCRIPTION

Figure 1:
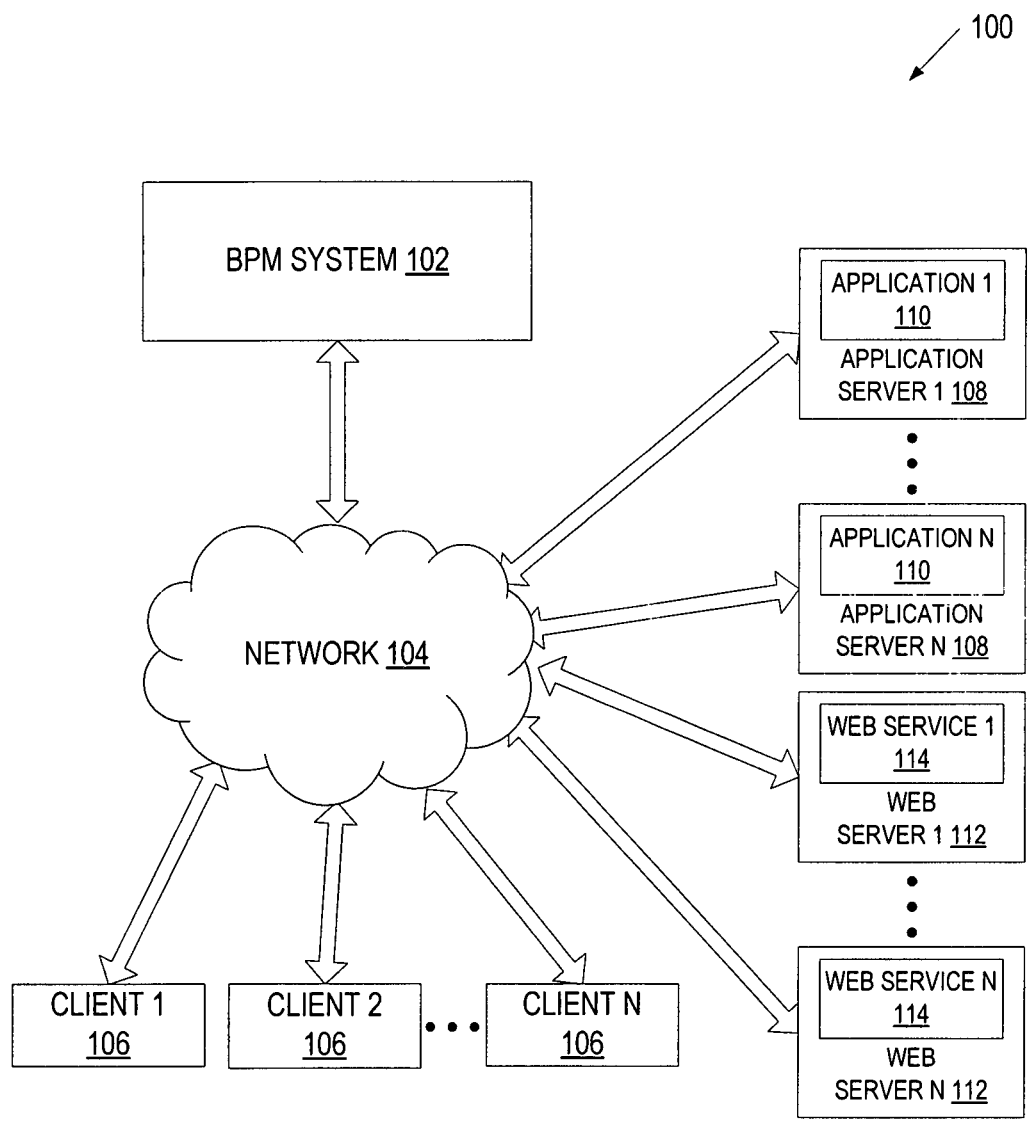
FIG. 1 illustrates an exemplary network architecture in which embodiments of the invention may operate.

Described herein is a method and apparatus for handling queues associated with web services of a business process. In one embodiment, a deployment server automatically generates deployment descriptors for executing a business process as a web application. A business process management (BPM) engine determines a default queue for the business process using a BPM configuration file. During execution of the business process, users are allowed to monitor the message load associated with the default queue. If a user decides to redistribute the message load, the user is allowed to specify a new set of queues for the business process to improve performance of the business process at runtime.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include client devices (clients) 106, a BPM system 102 and a network 104. The clients 102 may be, for example, personal computers (PCs), mobile phones, palm-sized computing devices, personal digital assistants (PDAs), etc.

The clients 106 are coupled to the BPM system 102 via the network 104, which may be a public network (e.g., Internet) or a private network (e.g., Ethernet or a local area Network (LAN)). The BPM system 102 may include one or more servers providing BPM functionality. In particular, the BPM system 102 may allow process developers to define business processes using a business process language such as BPEL or any other language allowing interaction with external entities through web service operations (e.g., web services flow language (WSFL) or business process modeling language (BPML)). Clients 106 may host browser applications to present user interfaces for defining business processes to their users.

The BPM system 102 allows automated deployment of business processes as web applications. In one embodiment, the BPM system 102 uses the J2EE web services deployment model defined in the J2EE specification (e.g., J2EE version 1.4specification). The J2EE web services deployment model requires a set of deployment descriptors that define how to deploy and assemble components into a specific environment. These deployment descriptors may include, for example, a web component deployment descriptor, a web services deployment descriptor, a business process application deployment descriptor, an application server deployment descriptor, etc. The web component deployment descriptor describes web components (e.g., servlets, Java server pages (JSPs), HTML files, etc.) used by a web module, environment variables, and security settings. The web services deployment descriptor defines web services produced by the business process and declares deployment characteristics of the web services. The application server deployment descriptor binds elements defined by the web component deployment descriptor to resources that exist in the operational environment. The BPM system 102 automatically generates the deployment descriptors, and then builds a web application package using the deployment descriptors. The web application package may also provide a reference to (or be otherwise associated with) a BPM configuration file that specifies a default queue for the business process. The default queue may be common for all business processes or for all instances of a specific business process.

Once the business process is deployed, the BPM system 102 can execute the business process using a BPM process engine. The BPM system 102 may provide user interfaces to allow users of clients 106 to interact with execution of the business process, monitor the execution of the business process, and view statistics about the business process execution. In particular, the BPM system 102 may allow a user (e.g., a system administrator) to monitor message load of a queue (e.g., a default queue defined in the BPM configuration file) used by the business process. If the user decides to redistribute the message load, the BPM system 102 allows the user to specify a new set of queues for the business process, and then rebuilds the web application package for the business process.

The network architecture 100 may also include application servers 108 hosting external applications 110, and/or web servers 112 hosting external web services 112. During execution, the business process may interact with external applications 110 and/or external web services 114 by invoking external applications 110 and/or web services 114 or exchanging data with external applications 110 and/or web services 114.

Figure 2:
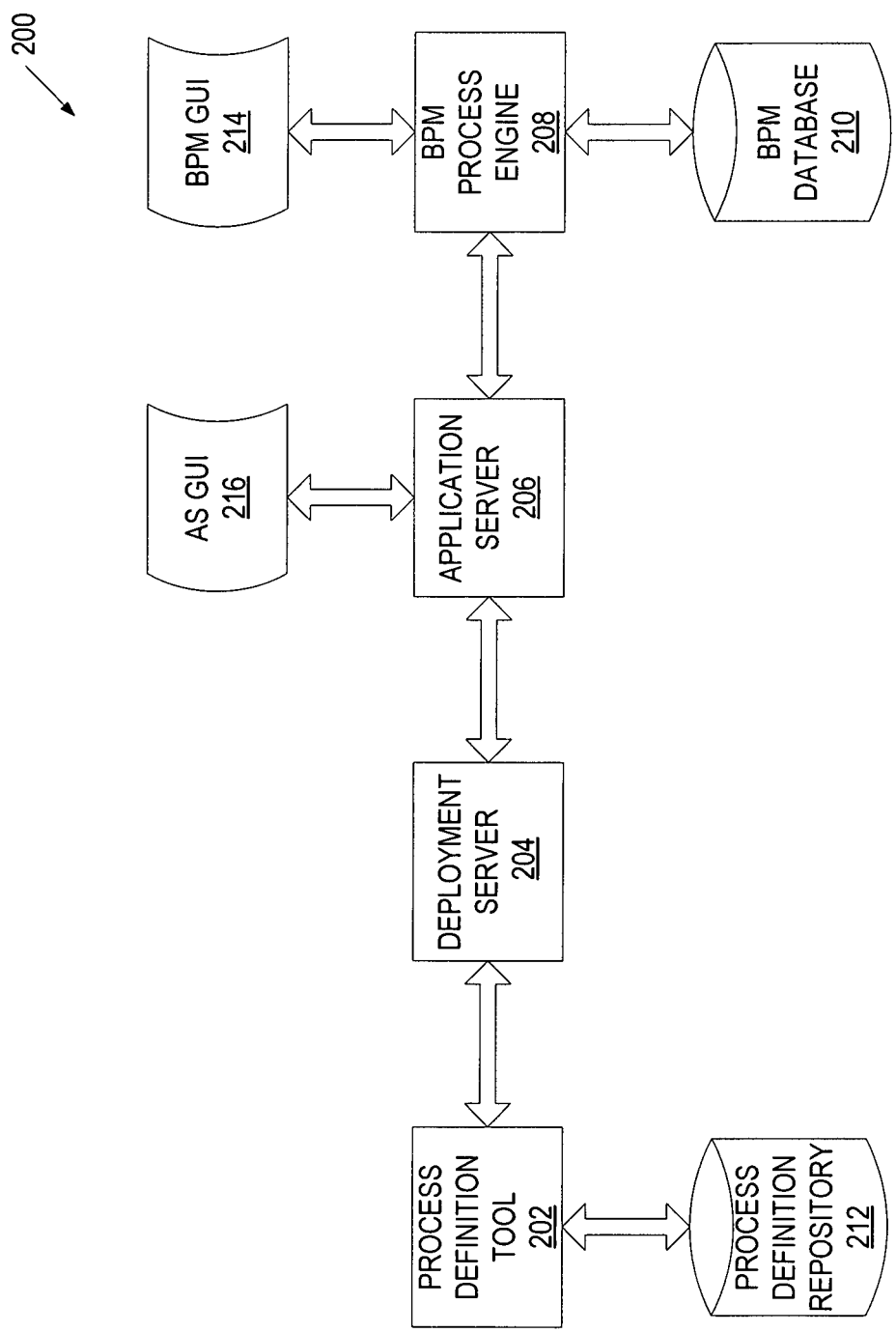
FIG. 2 illustrates a block diagram of one embodiment of a BPM system.

FIG. 2 is a block diagram of one embodiment of a BPM system 200. The BPM system 200 may include a process definition tool 202, a deployment server 204, an application server 206, and a BPM process engine 208. Some or all of the above components of the BPM system 200 may reside on the same machine or different machines coupled via a network (e.g., public network such as Internet or private network such as Intranet).

The process definition tool 202 allows users (e.g., process developers) to define business processes using one or more business process languages. These business process languages may include, for example, BPEL, WSFL, BPML, etc. When the user provides a definition of a business process, the process definition tool 202 stores the definition of the business process in a process definition repository 204.

The deployment server 204 is responsible for deployment of the business process as a web application. In one embodiment, the deployment server 204 uses the J2EE web services deployment model. The J2EE web services deployment model requires a set of deployment descriptors that define how to deploy and assemble components into a specific environment. These deployment descriptors may include, for example, a web component deployment descriptor and a web services deployment descriptor. The deployment server 204 can either automatically generate the deployment descriptors based on the definition of the business process, or allow a user to specify some or all of the deployment descriptors. The deployment server 204 then builds a web archive for the web application using the deployment descriptors, and deploys the web archive to the application server 206. The web archive may also provide a reference to (or be otherwise associated with) a BPM configuration file that specifies a default queue for the business process.

The application server 206 makes the business process accessible to external clients. The BPM process engine 208 manages execution of the business process. In one embodiment, the BPM process engine 208 uses Web services for J2EE (WSEE) to manage web service operations produced by the business process. The BPM process engine 204 stores runtime execution data in a BPM database 210.

The application server 206 and the BPM process engine 208 may provide GUIs allowing a user (e.g., a system administrator) to monitor runtime tasks generated by the process execution. In particular, an applications server GUI 216 and/or a BPM GUI 214 may present message load information pertaining to a queue used by the business process. The message load information may be provided in real time or as statistics of previously executed instances of the business process. Based on the message load information, the user may decide to redistribute the message load. For example, the user may notice that the queue became a bottleneck and decide to redistribute the message load among multiple queues. The user can do that by updating corresponding deployment descriptors, and then requesting the deployment server 204 to rebuild the web archive of the web application using the updated deployment descriptors, and to redeploy the web archive to the application server 206.

Figure 3:
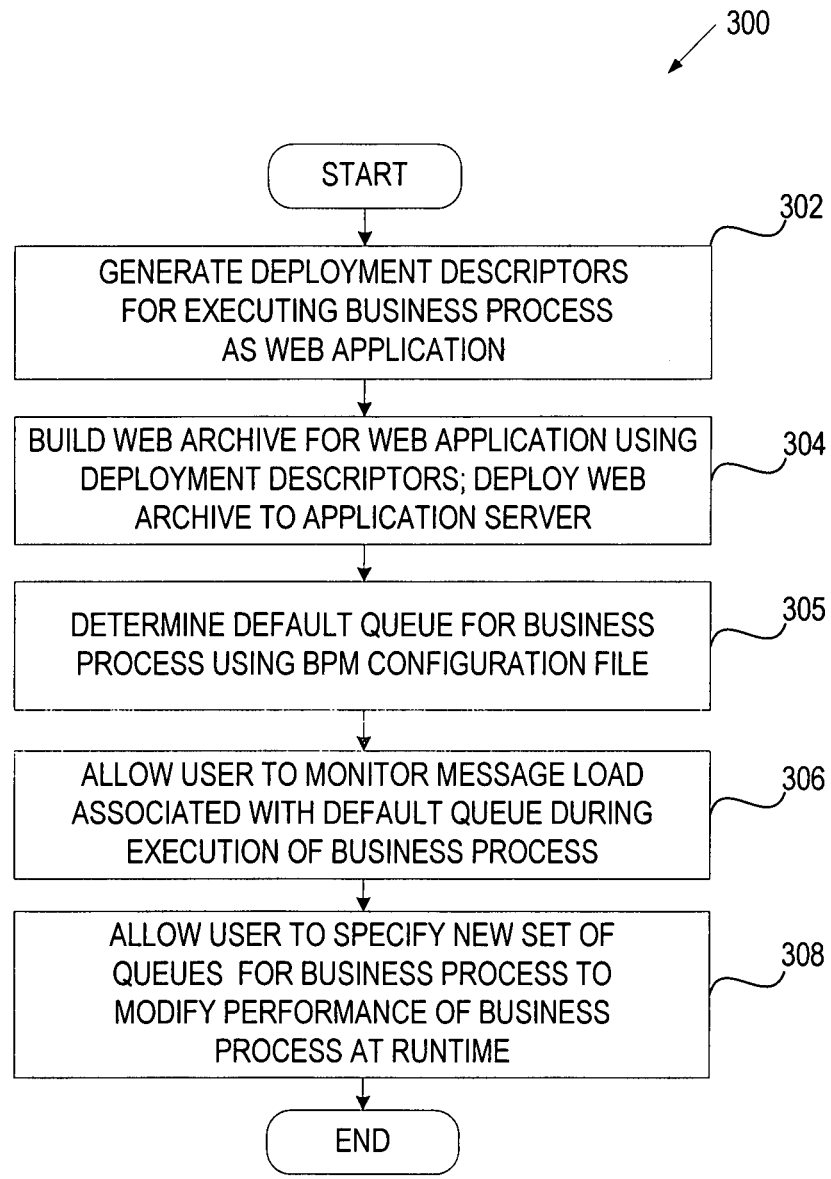
FIG. 3 illustrates a flow diagram of one embodiment of a method for handling queues associated with web services of a business process.

FIG. 3 illustrates a flow diagram of one embodiment of a method 300 for handling queues associated with web services of a business process. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Referring to FIG. 3, method 300 begins with processing logic generating deployment descriptors for executing a business process as a web application (block 302). Processing logic generates deployment descriptors using a definition of a business process provided by a user. The definition of a BPEL process may include a BPEL document and one or more web services description languages (WSDL) interface documents. The BPEL document may include one or more partner links to establish a relationship with one or more clients or suppliers of the process, and the roles the process will play for the partner links. The BEPL document may also specify a sequence of activities to be performed by the process and variables to be used by the process. The WSDL interface documents describe the interface of the process that will be presented to the outside world.

In one embodiment, processing logic first creates WSDL implementation documents based on the BPEL document and WSDL interface documents, and then creates Java mapping artifacts required for a WSEE deployment. Further, processing logic generates web component deployment descriptors (e.g., web.xml) for servlets representing Java service endpoints from the Java mapping artifacts, and web services deployment descriptors (e.g., webservices.xml) to specify endpoints to be deployed in a servlet container.

At block 304, processing logic builds a web archive for the web application using the deployment descriptors created at block 304, and deploys the web archive to the application server (e.g., by copying the web archive to a specific directory of the application server). The business process then becomes fully accessible to external clients through its endpoint address.

At block 305, processing logic determines a default queue for the business process using BPM configuration file. Subsequently, processing logic presents message load information associated with the default queue to the user (block 306). In one embodiment, the message load information is presented in real time while the business process is being executed. Alternatively, the message load information is presented after the execution of the business process (e.g., as statistics). Exemplary user interfaces for presenting message load information will be discussed in more detail below in conjunction with FIGS. 5A and 5B.

Based on the message load information, the user may decide to redistribute the message load. For example, the user may notice that the default queue is becoming a bottleneck, or the user may notice that two queues can be easily combined to handle the message load of both queues. Alternatively, the user may want to add more queues because the business process will be serving more clients, resulting in a higher number of incoming messages at the queue.

At block 308, processing logic allows the user to specify a new set of queues for the business process to modify the performance of the business process at runtime. In one embodiment, processing logic receives a user command to modify the default queue information, and presents to the user the deployment descriptors that may be affected by such a change. The user can then replace the default queue with a new set of queues in the business process application deployment descriptor (e.g., bpel-application.xml), and provide new destination and connection factory references in the web component deployment descriptor (e.g., web.xml). In addition, the user may modify the application server deployment descriptor (e.g., jboss-web.xml) to bind the new destination and connection factory references to resources in the operational environment. Processing logic then rebuilds the web application package for the business process using the updated descriptors as will be discussed in more detail below in conjunction with FIG. 4. Alternatively, the user may create new deployment descriptors, place them in the process archive, and issue a command to build a new application package for the business process.

Accordingly, method 300 simplifies the creation of the business process for a process designer who may not be familiar with the characteristics of the environment where the business process will execute. Subsequently, a system administrator can adjust the performance of the business process by redistributing message load among a different set of queues based on actual characteristics of the runtime environment.

Figure 4:
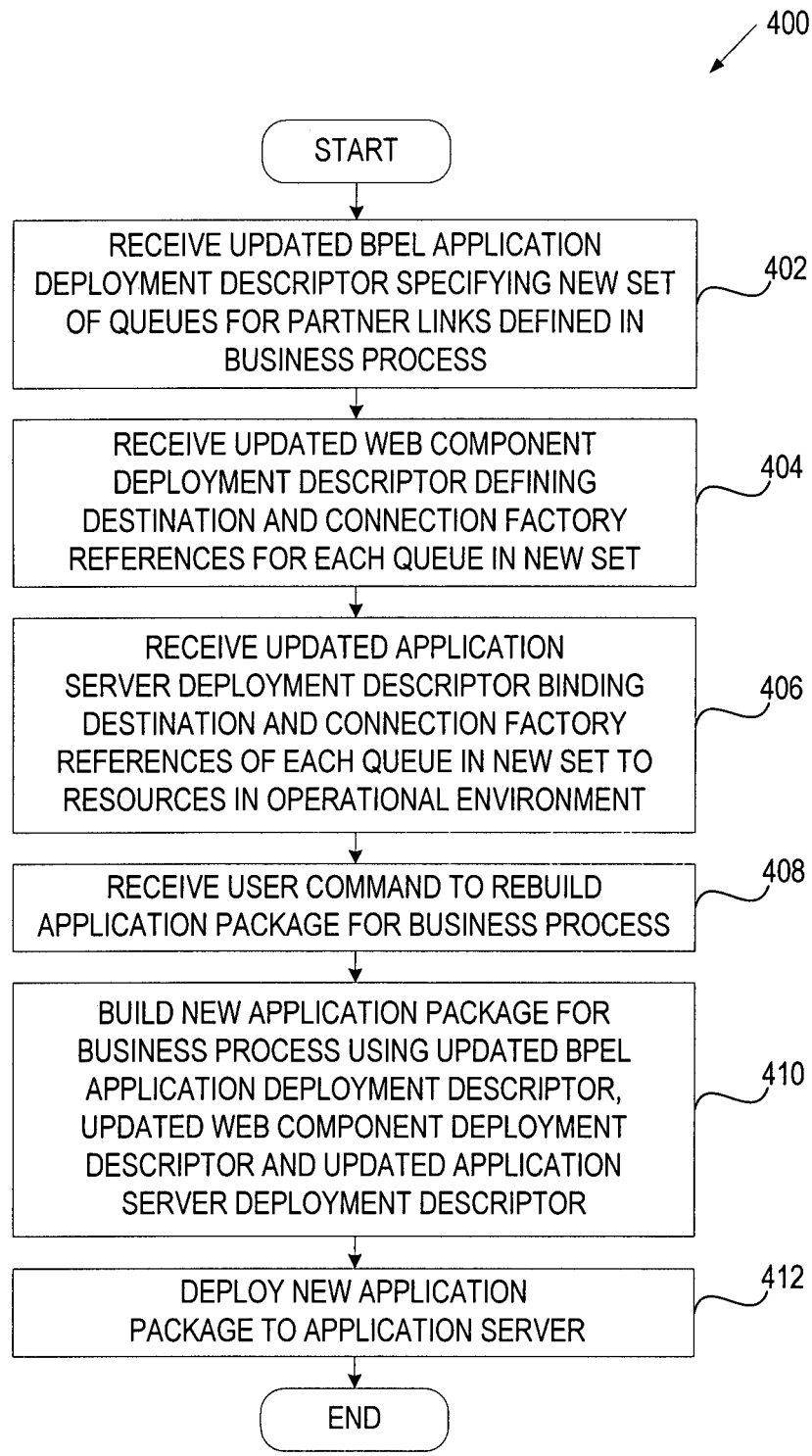
FIG. 4 illustrates a flow diagram of one embodiment of a method for rebuilding an application package for a business process.

FIG. 4 illustrates a flow diagram of one embodiment of a method 400 for modifying queues associated with web services of a business process. The method may be performed by processing logic that may comprise hardware (e.g., circuitry, dedicated logic, programmable logic, microcode, etc.), software (such as instructions run on a processing device), or a combination thereof. In one embodiment, method 400 is performed by BPM system 102 of FIG. 1.

Referring to FIG. 4, method 400 begins with processing logic receiving an updated BPEL application deployment descriptor specifying a new set of queues for partner links within the business process (block 402). Each partner link may be assigned a distinct queue, or a queue may be shared by two or more partner links.

At block 404, processing logic receives an updated web component deployment descriptor specifying destination and connection factory references for each queue in the new set. At block 406, processing logic receives an updated application server deployment descriptor binding destination and connection factory references of each queue in the new set to resources in the operational environment.

At block 408, processing logic receives a user command to rebuild the application package for the business process. At block 410, processing logic builds a new application package for the business process using the updated deployment descriptors. At block 412, processing logic deploys the new application package to the application server.

Figure 5A:
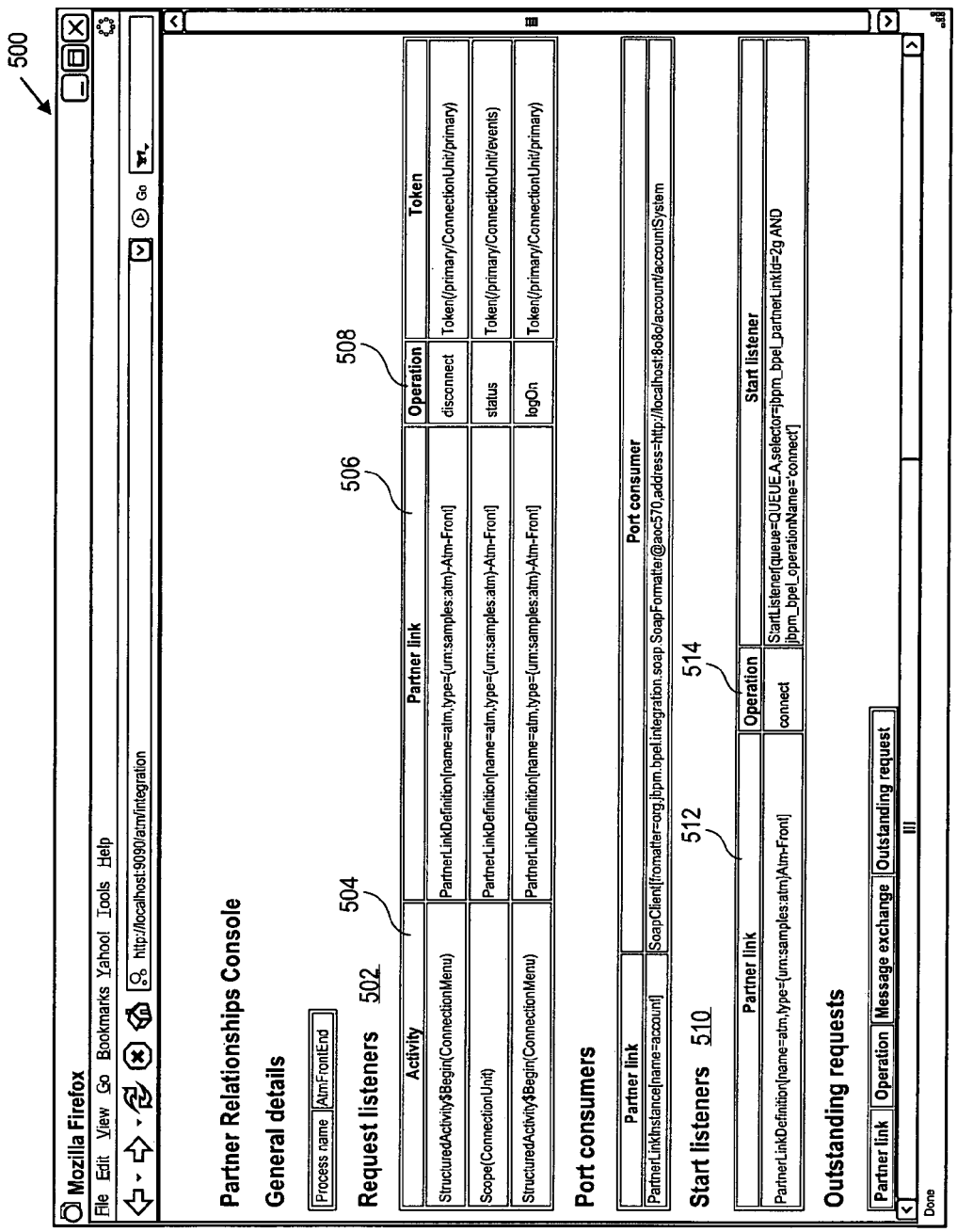

FIGS. 5A and 5B illustrate exemplary UIs facilitating monitoring of message load at a queue. Referring to FIG. 5A, UI 500 is provided by a BPM process engine (e.g., BPM process engine 208) to present information on inbound message activities enabled at a queue. In particular, request listeners 502 list activities 504 of current process instances that are waiting for messages to arrive. Each activity 504 is associated with a partner link 506 and an operation 508 to perform. When a message arrives at the queue, the queue examines all the activities 504 sequentially to find an activity matching the partner link and the operation of the message. If none of the activities 504 match the properties of the message, the queue examines start listeners 510 that wait for messages invoking new process instances. A start listener 510 specifies a partner link 512 and an operation 514.

The combined number of the request listeners 502 and start listeners 510 indicates how efficient the queue performance is. If the number of request and start listeners associated with different partner links exceeds a threshold, the user may decide to assign a separate queue to each partner link to improve performance (to reduce the number of listeners being evaluated during message matching).

Referring to FIG. 5B, UI 520 is provided by an application server (e.g., application server 206) to present information on properties 522 of the queue. In particular, properties 522 include a subscriber count 524 and a queue depth 526. The subscriber count 524 specifies the number of consumers waiting for messages to arrive at the queue. The queue depth 526 specifies the number of messages at the queue that are awaiting delivery to consumers. If one or both of the numbers 524 and 526 exceed a threshold, the user may decide to assign separate queues to individual partner links to facilitate parallel processing of messages at the queue. For more efficiency, some or all of the queues may be hosted by different machines.

Figure 6:
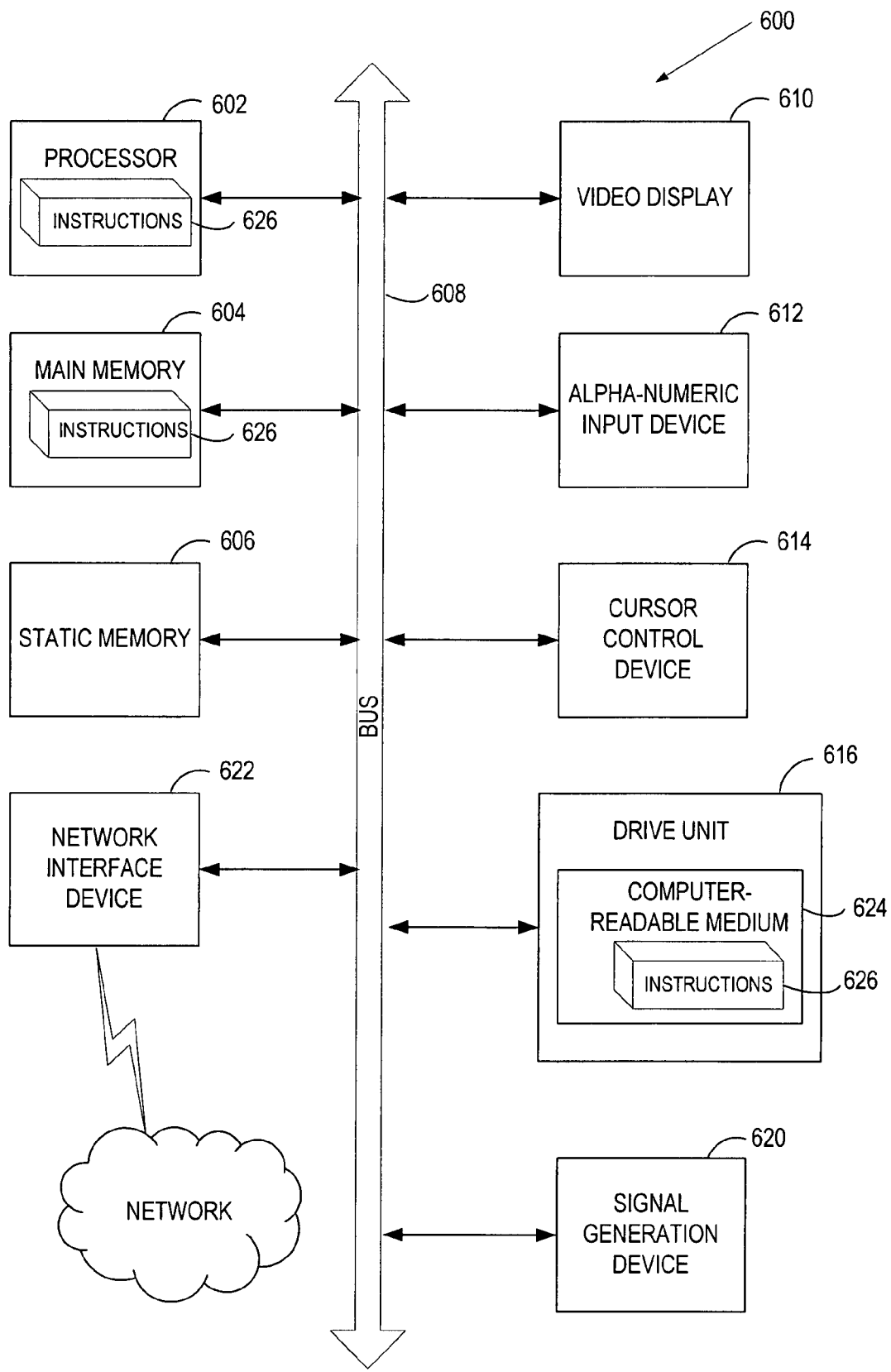
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   determining, by a processing device, a determined queue for messages to be exchanged during an execution of a business process;
   concurrently determining, by the processing device, a subscriber count and a queue depth for the determined queue;
   concurrently determining whether the subscriber count and the queue depth exceeds a threshold;
   providing, to a user, the subscriber count and the queue depth in response to the subscriber count and the queue depth exceeding the threshold, and an indication of a message load associated with the determined queue during the execution of the business process, the message load in view of a number of incoming messages at the determined queue;
   receiving a command from the user in response to providing, to the user, the subscriber count, the queue depth, and the indication of the message load, the command indicating one or more different queues to be used by the business process for messages to be exchanged, the one or more different queues not including the determined queue; and
   redistributing, by the processing device, the messages to be exchanged from the determined queue to the one or more different queues in view of the command from the user, wherein,
     receiving an updated BPEL application deployment descriptor specifying a new set of queues for partner links defined in the business process;
     receiving an updated web component deployment descriptor defining destination and connection factory references for each queue in the new set; and
     receiving an updated application server deployment descriptor binding the destination and connection factory references for each queue in the new set to resources in an operational environment; and
     building a new application package for the business process using the updated BPEL application deployment descriptor, the updated web component deployment descriptor and the updated application server deployment descriptor.

2. The method of claim 1, further comprising:
   generating deployment descriptors for executing the business process as a web application, the business process being defined using an executable business process language, wherein the executable business process language comprises a business process execution language (BPEL); and wherein the deployment descriptors comprise a web component deployment descriptor, a web services deployment descriptor, a BPEL application deployment descriptor, and an application server deployment descriptor.

3. The method of claim 2 wherein providing an indication of the message load associated with the determined queue comprises:

providing a BPM user interface indicating a number of inbound message activities currently enabled at the determined queue; and providing an application server user interface presenting message load information pertaining to the determined queue, wherein the determined queue is determined using a business process management (BPM) configuration file.

4. The method of claim 3 wherein the message load information comprises a number of consumers waiting for messages at the determined queue, and a number of messages expecting delivery at the determined queue.

5. The method of claim 2 further comprising:

receiving a user command to rebuild an application package for the business process;

deploying the new application package to an application server.

6. The method of claim 1 wherein the updated BPEL application descriptor assigns distinct queues to individual partner links within the business process.

7. The method of claim 1 wherein the new set of queues comprises at least one queue that is shared between two or more of the partner links within the business process.

8. A system comprising:

a memory; and a processing device, coupled to the memory, the processing device to:

determine a determined queue for messages to be exchanged during an execution of a business process, concurrently determine a subscriber count and a queue depth for the determined queue, concurrently determine whether the subscriber count and the queue depth exceeds a threshold, provide, to a user, the subscriber count and the queue depth in response to the subscriber count and the queue depth exceeding the threshold, and an indication of a message load associated with the determined queue during an execution of the business process, the message load in view of a number of incoming messages at the determined queue, receive a command from the user in response to provide, to the user, the subscriber count, the queue depth, and the indication of the message load, the command indicating one or more different queues to be used by the business process for messages to be exchanged, the one or more different queues not including the determined queue, and redistribute the messages to be exchanged from the determined queue to the one or more different queues in view of the command from the user, wherein, receiving an updated BPEL application deployment descriptor specifying a new set of queues for partner links defined in the business process;

receiving an updated web component deployment descriptor defining destination and connection factory references for each queue in the new set; and receiving an updated application server deployment descriptor binding the destination and connection factory references for each queue in the new set to resources in an operational environment; and building a new application package for the business process using the updated BPEL application deployment descriptor, the updated web component deployment descriptor and the updated application server deployment descriptor.

9. The system of claim 8, further comprising:

a deployment server to generate deployment descriptors for executing a business process as a web application, the business process being defined using an executable business process language, wherein the executable business process languages comprises a business process execution language (BPEL); and wherein the deployment descriptors comprise a web component deployment descriptor, a web services deployment descriptor, a BPEL application deployment descriptor, and an application server deployment descriptor.

10. The system of claim 8 further comprising an application server to provide user interface presenting message load information pertaining to the determined queue, the message load information comprising a number of consumers waiting for messages at the determined queue, and a number of messages expecting delivery at the determined queue, wherein the determined queue is determined using a business process management (BPM) configuration file.

11. The system of claim 8 further comprising provide a user interface indicating a number of inbound message activities currently enabled at the determined queue.

12. The system of claim 9 wherein the deployment server is further to receive a user command to rebuild an application package for the business process, deploy the new application package to an application server.

13. The system of claim 12 wherein the updated BPEL application descriptor assigns distinct queues to individual partner links within the business process.

14. The system of claim 12 wherein the new set of queues comprises at least one queue that is shared between two or more of the partner links within the business process.

15. A non-transitory computer-readable medium including instructions that, when accessed by a processing device, cause the processing device to execute operations comprising:

determining, by the processing device, a determined queue for messages to be exchanged during an execution of a business process;

concurrently determining, by the processing device, a subscriber count and a queue depth for the determined queue;

concurrently determining whether the subscriber count and the queue depth exceeds a threshold;

providing, to a user, the subscriber count and the queue depth in response to the subscriber count and the queue depth exceeding the threshold, and an indication of a message load associated with the determined queue during the execution of the business process, the message load in view of a number of incoming messages at the determined queue;

receiving a command from the user in response to providing, to the user, the subscriber count, the queue depth, and the indication of the message load, the command indicating one or more different queues to be used by the business process for messages to be exchanged, the one or more different queues not including the determined queue; and redistributing, by the processing device, the messages to be exchanged from the determined queue to the one or more different queues in view of the command from the user, wherein, receiving an updated BPEL application deployment descriptor specifying a new set of queues for partner links defined in the business process;

receiving an updated web component deployment descriptor defining destination and connection factory references for each queue in the new set; and receiving an updated application server deployment descriptor binding the destination and connection factory references for each queue in the new set to resources in an operational environment; and building a new application package for the business process using the updated BPEL application deployment descriptor, the updated web component deployment descriptor and the updated application server deployment descriptor.

16. The non-transitory computer-readable medium of claim 15 the operations further comprising:

generating deployment descriptors for executing a business process as a web application, the business process being defined using an executable business process language, wherein the executable business process language comprises a business process execution language (BPEL); and wherein the deployment descriptors a web component deployment descriptor, a web services deployment descriptor, a BPEL application deployment descriptor, and an application server deployment descriptor.

17. The non-transitory computer-readable medium of claim 16 wherein providing an indication of the message load associated with the determined queue comprises:

providing a business process management (BPM) user interface indicating a number of inbound message activities currently enabled at the determined queue; and providing an application server user interface presenting message load information pertaining to the determined queue, the message load information comprising a number of consumers waiting for messages at the determined queue, and a number of messages expecting delivery at the determined queue, wherein the determined queue is determined using a business process management (BPM) configuration file.

18. The non-transitory computer-readable medium of claim 16 wherein receiving an indication of one or more different queues for the business process comprises:

receiving a user command to rebuild an application package for the business process;

deploying the new application package to an application server.

19. The non-transitory computer-readable medium of claim 18 wherein the updated BPEL application descriptor assigns distinct queues to individual partner links within the business process.

20. The non-transitory computer-readable medium of claim 18 wherein the new set of queues comprises at least one queue that is shared between two or more of the partner links within the business process.

* * * * *